(12) United States Patent
Schuette

(10) Patent No.: US 8,566,669 B2
(45) Date of Patent: Oct. 22, 2013

(54) MEMORY SYSTEM AND METHOD FOR GENERATING AND TRANSFERRING PARITY INFORMATION

(75) Inventor: Franz Michael Schuette, Colorado Springs, CO (US)

(73) Assignee: OCZ Technology Group Inc., San Jose, CA (US)

( * ) Notice: Subject to any disclaimer, the term of this patent is extended or adjusted under 35 U.S.C. 154(b) by 215 days.

(21) Appl. No.: 13/177,839

(22) Filed: Jul. 7, 2011

(65) Prior Publication Data

US 2012/0011424 A1    Jan. 12, 2012

Related U.S. Application Data

(60) Provisional application No. 61/362,069, filed on Jul. 7, 2010.

(51) Int. Cl.
*G11C 29/00* (2006.01)
*G06F 12/00* (2006.01)
*G06F 12/02* (2006.01)
*G06F 13/00* (2006.01)
*G06F 13/28* (2006.01)

(52) U.S. Cl.
USPC ............................. 714/763; 711/1; 711/103

(58) Field of Classification Search
None
See application file for complete search history.

(56) References Cited

U.S. PATENT DOCUMENTS 5,295,255 A * 3/1994 Malecek et al. ................. 711/1
5,490,155 A * 2/1996 Abdoo et al. ................. 714/763

* cited by examiner

*Primary Examiner* — Guerrier Merant
(74) *Attorney, Agent, or Firm* — Hartman Global IP Law; Gary M. Hartman; Domenica N. S. Hartman

(57) ABSTRACT

A memory system and method for generating and transferring parity information within burst transactions of burst read and write transfers and without dedicated parity chips or parity data lines.

14 Claims, 3 Drawing Sheets

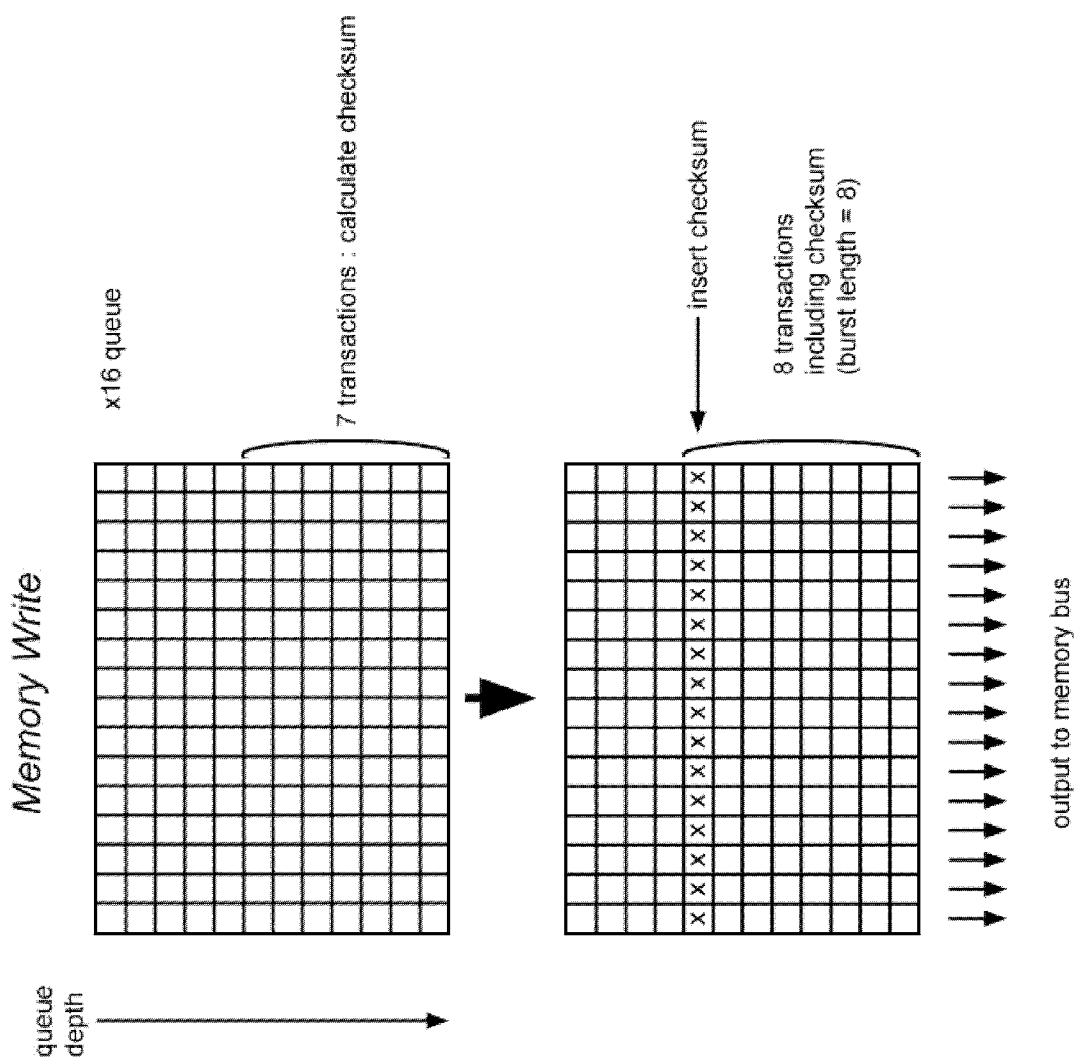

MEMORY SYSTEM AND METHOD FOR GENERATING AND TRANSFERRING PARITY INFORMATION

CROSS REFERENCE TO RELATED APPLICATIONS

This application claims the benefit of U.S. Provisional Application No. 61/362,069, filed Jul. 7, 2010, the contents of which are incorporated herein by reference.

BACKGROUND OF THE INVENTION

The present invention generally relates to memory devices for use with computers and other processing apparatuses. More particularly, this invention relates to error checking and correction (ECC) in a memory subsystem of a processing apparatus.

Historically, most memory devices employed in computer systems are "imperfect," that is, individual memory cells of a memory device may exhibit flaws that result in data corruption. In most cases, the flaws were hardware-related, resulting in reproducible "hard errors" that occur every time data are stored in the respective memory cell. These cells can typically be remapped, that is, excluded from further use once recognized through testing. As a nonlimiting example, bad blocks containing flawed memory cells are typically present in NAND flash memory chips. Bad NAND flash memory blocks are typically recognized and flagged to be excluded from use for data storage. With better implementation of process technology, at least in the area of dynamic random access memory (DRAM) or static random access memory (SRAM), the occurrence of bad cells is minimal and can be mitigated by over provisioning, that is, having spare rows or columns as a substitute for those having stuck bits.

A different type of error, generally referred to as a "soft error," is not reproducible and occur spontaneously. In this type of error, primarily attributed to a bitline being hit by alpha particles or cosmic ray, a given bit value in a memory cell can suddenly flip and cause data corruption even though the memory cell in question has functioned correctly in the past and subsequent tests do not show any occurrence of errors at the same address. The occurrence of soft errors is referred to as soft error rate (SER) and depends on environmental factors such as elevation above sea level and/or occurrence of alpha particles in the near environment, the process geometry and, last but not least, the shielding of the memory device. The mechanisms of soft-error generation are somewhat complex but the general consensus is that primarily open pages are affected. That is, soft errors occur in pages wherein the passgate transistor to the DRAM cell is open or wherein the sense-amplifiers are in the process of amplifying the charge of the cell in order to determine the bit value. Memory cells in closed pages, in contrast, are rather immune to soft errors since they are "protected" by the gate transistor.

According to the above, soft errors only occur in areas of a memory array that are being accessed. Soft errors can also occur in parts of a memory array that are not programmed, in which case their occurrence would not only be inconsequential but also go completely unnoticed. However, if a soft error occurs in an area of memory holding valid data, either instructions or data can be affected. In the first case, the error will most likely cause a program to crash. In the second scenario, the error will cause some data corruption. Depending on the application, a soft error (in most cases, a single altered bit) may result in the change of a pixel value in an image file, a change in geometry in a CAD file, an incorrect tone in an audio file, or an incorrect character in a document. Most of these errors will go unnoticed and have no further consequences because of their transient nature. However, in the case of documents or financial records, single bit errors can have serious repercussions in that they may corrupt an entire data base through proliferation over iterative computations.

Particularly vulnerable applications include simulation and financial data bases, where a single bit error can cause a floating point shift or have other catastrophic consequences. In this type of environment, an error check, or rather data integrity check combined with an error correction mechanism is of utmost importance. The typical term for describing this mechanism is error checking and correction (ECC). In the case of system memories of personal computer systems, including PC architecture-based servers, ECC is implemented in a rather simple manner. In addition to the typically 64-bit wide data bus, an extra 8-bit bus is added where each bit is encoded with the checksum of one byte (8 bits). The total bus width in this case is 72 bits. FIG. 1 schematically represents an example of a conventional ECC-enabled memory module 10, in which eight data memory integrated circuit (ICs) devices (chips) 12 are arranged in an x8 configuration and combined with a "parity" chip 14 (x8) for the checksum bits. The module uses a total of seventy-two input/output (I/O) pins 16 to accommodate the sixty-four data bits and eight parity bits. When data are written to the memory module 10, a memory controller (not shown) performs an XOR operation to establish the checksum of each segment according to Hamming or other established codes, and the combined checksum of the entire transaction is stored in the parity chip 14. When the data are read back, the memory controller also requests the checksum from the parity chip 14 and, after reading the data, performs the same parity calculation as on a read and then compares the resulting checksum or parity value with the parity value read in the same transaction. In the simplest case, this will show whether there is any single bit error. Depending on the algorithm used to generate the checksum, double-bit errors may also be detected and single-bit errors may be corrected "on the fly."

The advantage of this type of ECC is its speed and low payload on the memory controller. However, a disadvantage is that the entire ECC functionality is very rigid and requires hardware resources, including extra data lines (traces) and additional memory chips, which go unused if ECC is turned off. Moreover, with increasing error rates, this type of ECC cannot be upgraded to better suit the system needs. Accordingly, a more flexible architecture and ECC implementation would have far reaching benefits.

BRIEF DESCRIPTION OF THE INVENTION

The present invention provides a memory system and method for implementing error checking and correction in the memory system by storing and transferring parity information without the use of a dedicated parity chip or parity data lines.

According to a first aspect of the invention, a memory system is used with a processing apparatus and includes at least one memory device, a memory controller, and a plurality of data lines connecting the memory device to the memory controller to enable data transfers between the memory device and the memory controller. The memory controller includes a buffer for storing transient data, and is adapted to generate a checksum of all data bits transferred over at least a first of the data lines during n consecutive burst transactions of a burst transfer. The memory controller then transfers the checksum in an n+1 burst transaction to the memory device using the data lines over which the data transfers occur between the memory device and the memory controller.

According to a second aspect of the invention, a method is provided for performing error checking of memory transactions with a memory module of a memory system. The method includes the use of a memory controller that is functionally connected to a memory device on the memory module through a parallel data bus. The data bus comprises data lines that directly connect a plurality of input/output transceivers on the memory controller and the memory device. The memory controller is operated to calculate a checksum for data bits transferred on at least a first of the data lines during a burst transfer between the memory controller and the memory device. The checksum is written as one transaction of a plurality of transactions of the burst write transfer from the memory controller to the memory device. The data are read in a burst read transfer from the memory device to the memory controller, wherein the burst read transfer comprises a plurality of transactions and one transaction thereof is the checksum of all data bits transferred on the first data line. The memory controller is then operated to calculate the checksum of all data bits, and the calculated checksum is compared with the checksum read from the memory device.

A technical effect of the invention is the ability to store and transfer parity information without the use of a dedicated parity chip or parity data lines. Instead, parity information (values) are stored in memory devices in which data are stored and transferred over the same data lines used to transfer the data. The parity information is stored during a burst write transfer to the memory device as part of a burst write transfer, and retrieved by the memory system from the memory device during a burst read transfer.

Other aspects and advantages of this invention will be better appreciated from the following detailed description.

BRIEF DESCRIPTION OF THE DRAWINGS

FIG. 4 represents a write operation to a 16-bit data bus in accordance with an embodiment of the invention.

DETAILED DESCRIPTION OF THE INVENTION

As discussed above, conventional methods of error checking and correction use redundant storage locations to store parity information of data. For error checking, the data are read, along with the parity information and the same algorithms used to generate the parity information or checksum when the data were stored is applied to the data that are read back from the storage media. The new checksum is then compared to the old checksum and if the two values match, a corruption of data can be excluded. This is the fundamental underlying principle of any error-checking (and correction) operation.

Depending on the quality or "tolerated error rate" of the storage media, more sophisticated methods can be employed with the added capability of performing multi-bit error detection and also multi-bit error correction through Reed Solomon or BCH algorithms. This type of extra redundancy is required primarily in memory subsystems in mission-critical environments and situations where largely "imperfect" memory is used, meaning that a high error rate is inherent to the technology and must be tolerated. A common example is NAND flash memory devices, where it is well-understood that errors may occur and error correction is used to increase yield by allowing cells with occasional failures to remain active. A rule of thumb is that the number of detectable errors and correctable bits increases with the ratio of redundant storage allocated to ECC data over the actual data.

Figure 1:
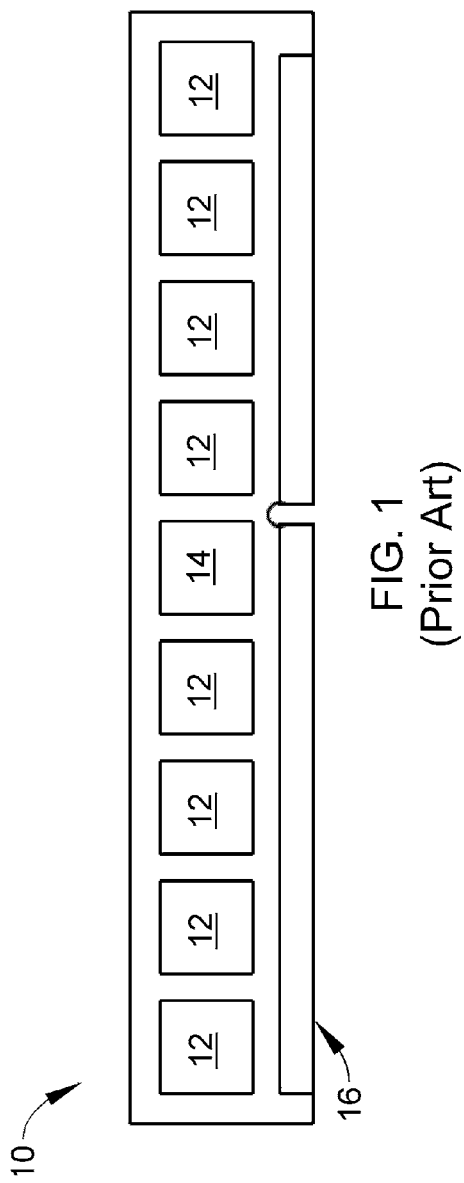
FIG. 1 schematically represents a conventional ECC-enabled memory module equipped with a parity chip.

In order to allow recovery after a catastrophic failure, high-end systems often store parity values in different locations. The same holds true for RAID systems. For example, in RAID Level 4 configurations parity data are stored on a dedicated physical memory, such as a hard disk drive or a solid state drive. In RAID Level 5 systems, parity values are stored in a distributed manner, in which each drive contains parity values for data stored on other drives in a rotating scheme so that each stripe block has either data or parity values, but never both on the same physical device. In the case of system memory, ECC is most commonly implemented using a dedicated parity chip, as represented in FIG. 1. On a parallel data bus with the currently most common form of 64-bit width, memory modules of the type represented in FIG. 1 require eight additional data lines to load and store ECC values in the additional parity chip 14 so that typically each bit on the parity chip 14 has the parity information for one 8-bit portion of the data bus, which may be I/Os of a single chip, or one I/O of each chip, or any combination or permutation thereof.

Drawbacks with the above include an increased pin-count on the memory module 10 and memory controller, along with the requirement for additional real estate for line routing. Real estate and extra pins are costly additions to the overall design of a motherboard and memory modules. Moreover, in the case of volatile memory, for example, different generations of synchronous DRAM (SDRAM), data recovery after failure is not necessarily required (except for chip-kill in high end servers), thus negating the need for storing parity information on physically different devices.

Figure 2:
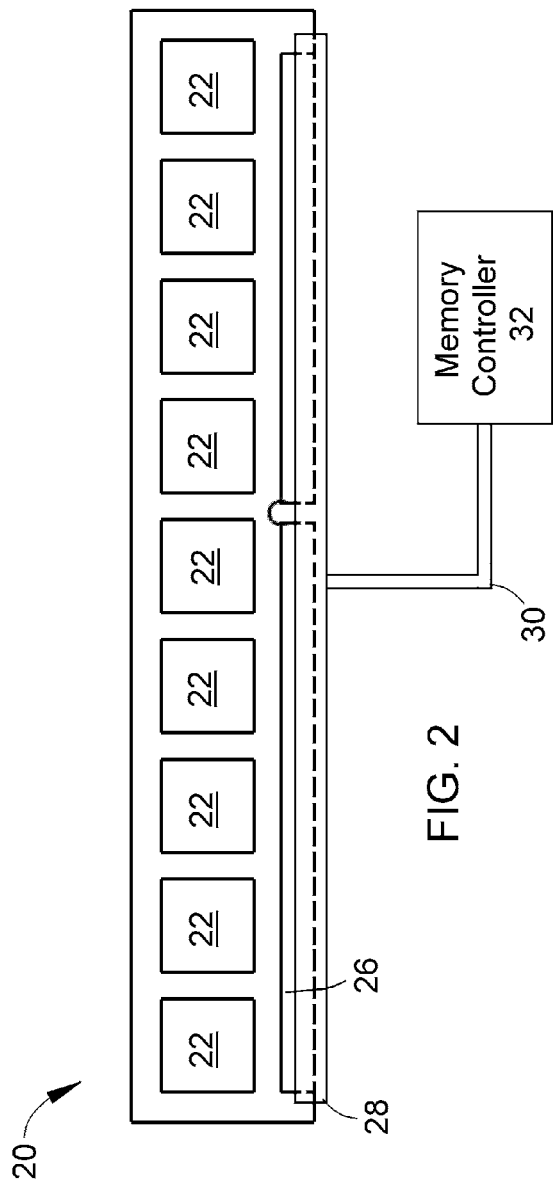
FIG. 2 schematically represents a memory module that is ECC-enabled without the need for a parity chip in accordance with an embodiment of the invention.

In contrast with the above, preferred embodiments of the current invention are able to use standard memory modules or configurations without extra parity chips or additional data lines to store parity data. To illustrate, FIG. 2 schematically represents a memory module 20 as part of a memory system of a personal computer or other processing apparatus (not shown). In particular, the module 20 is part of a system main (volatile) memory installed in a memory (expansion) slot (socket) 28 of a mainboard or motherboard (not shown) of the memory system. As represented in FIG. 2, the memory system further includes a parallel data bus 30 that serves as the interface between multiple IC memory chips 22 on the module 20 and a memory controller 32 (typically located on the motherboard). The memory chips 22 may be of a variety of types of volatile memory devices, for example, DRAM chips and more preferably SDRAM chips, though the use of other types of chips is also foreseeable, including burst SRAM chips (as opposed to SRAM chips adapted for single-bit transfers). As a parallel connection, the bus 30 connects the memory chips 22 on the module 20 to a plurality of input/output (I/O) transceivers (not shown) conventionally provided on the memory controller 32 through a like number of input/output data lines/traces (not shown) arranged to provide a direct-mapped connection between the memory controller 32 and each memory chip 22, wherein each I/O pin of each chip 22 is directly and individually connected to an I/O pin on the controller 32 through one of the data lines of the bus 30.

In contrast to the module 10 of FIG. 1, the memory module 20 does not include a parity chip to implement ECC. Instead, the invention utilizes a modified burst transfer technique. As known in the art, a burst transfer refers to a process of writing and reading sets of data to the system memory of a personal computer (or other processing apparatus). Current memory systems using DRAM memory devices commonly default to a burst transfer length of eight transactions. Since the smallest transfer unit is currently 8×64 bits or 64 bytes or, in the case of dual channel memory, 128 bytes, this often results in underutilization of the data bus 30. The burst transfer is initiated by selecting a row or page of all memory chips 22 belonging to the same physical bank or "rank" enabled through a chip select signal, followed by a column address that initiates transfer of the first transaction onto the bus to be received by the memory controller 32. At the same time, the core logic of each selected memory chip 22 generates the next seven column addresses, after which the data are output into prefetch buffers at the I/O portion of the memory chips 22 and then "strobed out" onto the bus 30. The memory chips 22 do not know (or care) what kind of data they are outputting or storing, in the case that the transfer is a write transaction.

The memory module 20 of FIG. 2 is adapted to implement error checking through the use of the memory controller 32 that calculates a checksum for all data bits transferred on the data lines of the bus 30 during a burst write transfer between the memory controller 32 and one or more memory chips 22 on the memory module 20. For this purpose, the memory controller 32 includes a queue for transiently storing data, including the data read to and from the module 20 and the parity information calculated by the controller 32. The controller 32 is further adapted to generate a checksum of all data bits transferred over the data lines of the bus 30 during n consecutive burst transactions of a burst transfer, and then transfer the checksum in an n+1 burst transaction to the module 20. In the example described above, in which the memory system operates on a default burst transfer length of eight transactions, the controller 32 would encode seven of the eight transactions into a parity bit that is then written as the last transaction of the burst write transfer to the memory module 20. During a burst read transfer, the same principle is applied in reverse, that is, the controller 32 reads data in the first seven transactions transferred from the memory module 20 on the data lines of the bus 30, and the memory controller 32 performs the parity calculations on the fly as the data arrive to compare the resulting checksum with the stored parity value read in the eighth transaction. A variation of this mode of operation entails changing the burst transfer length to nine transactions to maintain eight data transfers for a better match with cache lines. The burst transfer length can be set up during initialization using a mode register set (MRS) command.

The memory controller 32 can be configured during system boot-up to change its mode of operation (for example, its state machine) to enable or disable parity transfer over the parallel data bus between the controller 32 and chips 22, in other words, switch between performing data integrity checks or using the entire bandwidth of the data bus 30 for transferring data bits between the controller 32 and module 20. In addition or alternatively, the memory controller 32 can be configured to switch between these two modes of operation on the fly after system boot-up, for example, in response to starting a particular software application on the computer.

In view of the above, a memory system containing the memory module 20 and memory controller 32 of FIG. 2 is adapted to perform error checking of memory transactions in a manner significantly different what is performed with the memory module 10 of FIG. 1, in that the module 20 does not have a parity chip and the parity data are not transferred between the module 20 and the controller 32 over dedicated parity data lines on the bus 30. If the memory chips 22 are DRAM chips, every write command may entail a multiplexed row and column address issued by the memory controller 32 and an on-die address unit on each selected chip 22 can autonomously generate subsequent column addresses for all but the final transaction of the burst write transfer, and on every read command each selected chip 22 can autonomously generate subsequent column addresses for all but the first transaction of the burst read transfer. In this case, any of the individual transactions can contain the parity value of all bit "data" values on the same data line. Specifically, seven data bits can be transferred to the same pin followed by the eighth value, which is the parity value for the seven preceding bits. To eliminate I/O trace specific errors, the parity value can also be shifted to a different pin and I/O data line on the bus 30 than was used to transfer the data bits, for example, using an offset or inversion. In this manner, the checksum bit transferred over one pin can be associated with the data transferred over another pin. This operating mode can be used to provide spatial separation of parity bits from actual data across the entire bus. While the parity data can be shifted across the I/O pins of an individual memory chip 22, shifting of parity data can across different chips 22 is also possible.

Figure 3:
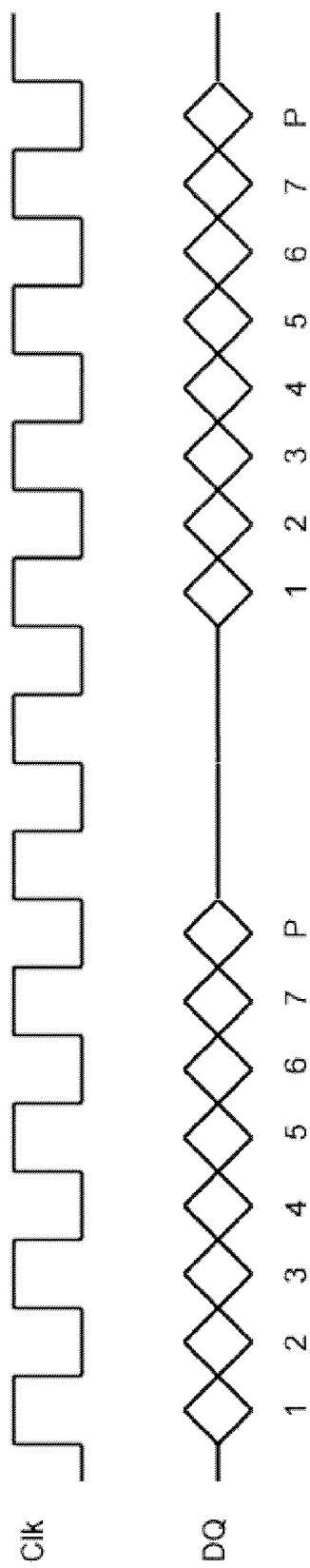
FIG. 3 depicts a timing diagram of a DDR memory chip operating to have two I/O transactions per clock cycle in accordance with an embodiment of the invention.

FIG. 3 depicts a timing diagram for a DDR (double data rate SDRAM, or DDR-SDRAM), which supports data transfers on both edges of each clock cycle, and therefore two I/O transactions over a data (DQ) line per clock cycle. In memory modules of the existing art, each of the eight transactions (per burst) would be data. However, when the invention is implemented in this scenario, one of the data transactions is converted into a parity transaction, that is, one of the bits transferred during a burst over this particular data line contains the parity information for all other bits transferred on the same DQ line. The parity bit may belong to the data transferred over the same DQ line or may correspond to data transferred over a different DQ line.

FIG. 4 represents an embodiment of the invention in which a write operation to a 16-bit data bus (for example, the bus 30 of FIG. 2) uses a 16-bit wide queue or buffer in a memory controller (for example, the controller 32 of FIG. 2). In this embodiment, seven transactions are scheduled for output on the bus after a checksum for all seven bits on each I/O has been generated and inserted into the queue to become part of a burst transfer. The location of the checksum may be scrambled or shuffled, that is, any given check bit may correspond to seven transactions on any of the DQ lines. In principle, the checksum can also be generated for mixed data sets that are transferred over different DQ lines as long as they are part of the same burst. For example, transfer 0 of DQ 0, transfer 1 of DQ 1 and so on could be used to generate the checksum that can be any part of the transfer of the data set.

As should be evident from the above, the invention is applicable to various types of memory subsystems, regardless of whether it is system memory of x86 computer systems in the form of dual inline memory modules (DIMM) or small outline dual inline memory modules (SO-DIMM) often used in notebooks and net-appliances. Another application is the use of the invention in general purpose graphics processing units (GP-GPUs).

While the invention has been described in terms of specific embodiments, it is apparent that other forms could be adopted by one skilled in the art. For example, though the invention has been described in reference to memory modules that make use of DRAM memory chips, it is foreseeable that functionally-equivalent components could be used or subsequently developed to perform their intended function. Furthermore, nonvolatile memory devices (for example, NAND flash memory) could be adapted to work according to the same or similar principle. Therefore, the scope of the invention is to be limited only by the following claims.

The invention claimed is:

1. A method of performing error checking of memory transactions with a memory module of a memory system of a processing apparatus, the method comprising:
   providing a memory controller functionally connected to a volatile memory device on the memory module through a parallel data bus, the parallel data bus comprising data lines that directly connect a plurality of input/output transceivers on the memory controller and the volatile memory device, the volatile memory device operating to have burst data transfers on edges of clock cycles, each burst data transfer being a burst write transfer or a burst read transfer, each burst data transfer having a burst length and comprising a plurality of transactions;
   operating the memory controller to calculate a checksum for data bits transferred on at least a first of the data lines during a burst write transfer between the memory controller and the volatile memory device;
   writing the checksum as one transaction of the plurality of transactions of the burst write transfer from the memory controller to the volatile memory device;
   reading the data in a burst read transfer from the volatile memory device to the memory controller, wherein one transaction of the burst read transfer is the checksum of all data bits transferred on the first data line;
   operating the memory controller to calculate the checksum of all data bits; and
   comparing the calculated checksum with the checksum read from the volatile memory device.

2. The method of claim 1, wherein the volatile memory device is mounted on a memory module that does not have a parity chip and the method does not comprise transferring parity data between the volatile memory device and the memory controller over parity data lines.

3. The method of claim 1, wherein the volatile memory device is a DRAM chip organized in rows and columns, on every write command the volatile memory device autonomously generates subsequent column addresses for all but the first transaction of the plurality of transactions of the burst write transfer, and on every read command the volatile memory device autonomously generates subsequent column addresses for all but the first transaction of the burst read transfer.

4. The method of claim 1, wherein the volatile memory device is a burst SRAM chip.

5. The method of claim 1, further comprising configuring the memory controller during initialization of the memory system to change its mode of operation to enable or disable parity transfer over the parallel data bus between the memory controller and the volatile memory device.

6. The method of claim 1, further comprising configuring the memory controller after boot-up of the processing apparatus to change its mode of operation on the fly to enable or disable parity transfer over the parallel data bus between the memory controller and the volatile memory device.

7. The method of claim 1, wherein the processing apparatus is a personal computer.

8. A memory system of a processing apparatus, the memory system comprising at least one volatile memory device, a memory controller, and a plurality of data lines connecting the volatile memory device to the memory controller to enable data transfers between the volatile memory device and the memory controller, the memory controller comprising:
   a buffer for storing transient data;
   means for generating a checksum of all data bits transferred over at least a first of the data lines during n consecutive burst transactions of a burst transfer; and
   means for transferring the checksum in an n+1 burst transaction to the volatile memory device using the data lines over which the data transfers occur between the volatile memory device and the memory controller;
   wherein the volatile memory device is a DRAM chip organized in rows and columns, on every write command the volatile memory device autonomously generates subsequent column addresses for all but the first transaction of the plurality of transactions of the burst write transfer, and on every read command the volatile memory device autonomously generates subsequent column addresses for all but the first transaction of the plurality of transactions of the burst read transfer.

9. The memory system of claim 8, wherein the memory controller is configured to read data in a burst transfer of n+1 transactions from the volatile memory device, the generating means generates the checksum of n bits on the first data line, and the memory controller further comprises means for comparing the checksum with an n+1 bit of the burst read.

10. The memory system of claim 8, wherein the transferring means transfers the checksum over the first data line over which the data bits are transferred.

11. The memory system of claim 8, wherein the transferring means transfers the checksum over a second data line that is different from the first data line over which the data bits are transferred.

12. The memory system of claim 8, wherein the volatile memory device is a burst SRAM chip.

13. The memory system of claim 8, wherein the volatile memory device is mounted on a memory module that does not have a parity chip and does not have parity data lines connected for transferring parity data between the volatile memory device and the memory controller.

14. The memory system of claim 8, wherein the processing apparatus is a personal computer.

* * * * *